(12) United States Patent
Xu et al.

(10) Patent No.: US 12,389,118 B2
(45) Date of Patent: Aug. 12, 2025

(54) LENS DRIVING DEVICE AND ELECTRONIC DEVICE

(71) Applicant: Changzhou AAC Raytech Optronics Co., Ltd., Changzhou (CN)

(72) Inventors: Tongming Xu, Changzhou (CN); Suohe Wei, Changzhou (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 102 days.

(21) Appl. No.: 18/393,590

(22) Filed: Dec. 21, 2023

(65) Prior Publication Data

US 2025/0024148 A1    Jan. 16, 2025

Related U.S. Application Data

(63) Continuation of application No. PCT/CN2023/106781, filed on Jul. 11, 2023.

(51) Int. Cl.
*H04N 23/68* (2023.01)
*H04N 23/55* (2023.01)

(52) U.S. Cl.
CPC .......... *H04N 23/687* (2023.01); *H04N 23/55* (2023.01)

(58) Field of Classification Search
None
See application file for complete search history.

(56) References Cited

U.S. PATENT DOCUMENTS

| 2016/0187668 A1* | 6/2016 | Hayashi | G02B 13/001 |
| | | | 359/507 |
| 2016/0291344 A1* | 10/2016 | Terajima | G02B 27/646 |
| 2017/0090146 A1* | 3/2017 | Ishiguro | G02B 7/08 |

FOREIGN PATENT DOCUMENTS

WO    WO-2022088343 A1 *  5/2022

OTHER PUBLICATIONS

English translation of WO-2022088343-A1, Li, 2022 (Year: 2022).*

* cited by examiner

*Primary Examiner* — James M Hannett
(74) *Attorney, Agent, or Firm* — Wiersch Law Group

(57) ABSTRACT

A lens driving device, including a base, a support frame suspended above the base, a lens holder for mounting a lens, a pair of conductive elastic sheets, a support suspension wire, a circuit board, a focusing circuit board, a shared magnet, a focusing coil and an anti-shake coil. The conductive elastic sheets are elastically connected to the support frame and lens holder. The circuit board includes a stationary portion and a movable portion connected thereto. The support suspension wire elastically connects the conductive elastic sheet with the movable portion, and can only support the movable portion. The focusing circuit board fixedly and electrically connects the conductive elastic sheet with the stationary portion, and electrical connection is led from the circuit board, ensuring stable and reliable electrical connection between the conductive elastic sheet, focusing circuit board and circuit board. An electronic device including the lens driving device is provided.

10 Claims, 8 Drawing Sheets

LENS DRIVING DEVICE AND ELECTRONIC DEVICE

CROSS-REFERENCE TO RELATED APPLICATIONS

This application is a continuation of International Patent Application No. PCT/CN2023/106781, filed on Jul. 11, 2023. The content of the aforementioned application, including any intervening amendments made thereto, is incorporated herein by reference in its entirety.

TECHNICAL FIELD

The present application relates to cameras, and more particularly to a lens driving device and an electronic device.

BACKGROUND

With the development of camera technology, the lens driving device has been widely used in various camera devices. The combination of the lens driving device and various portable electronic devices, such as cell phones, video cameras, computers, etc., is even more favored by consumers.

The lens driving device of the related art includes a base, a support frame, a lens holder for mounting a lens, a pair of upper elastic sheets connecting the support frame and the lens holder to suspend the lens holder within the support frame, a suspension wire connecting the support frame and the base to suspend the support frame above the base and electrically connected to the upper elastic sheets, a focusing coil fixed to the outer side of the lens holder, a shared magnet fixed to the support frame and electrically coupled to the focusing coil to drive the lens holder to move in the direction of the optical axis, and an anti-shake coil electrically coupled to the shared magnet to drive the lens holder to move in the direction perpendicular to the optical axis. The base is provided with a conductive terminal electrically connected to the suspension wire. However, the suspension wire in this lens driving device not only plays a role in supporting the suspension arrangement, but also provides the electrical connection. In this case, the suspension wire will experience deformation when supporting the support frame to move relative to the base, which will result in easy detachment of the suspension wire from the conductive terminal, thereby affecting the reliability of the lens driving device.

Therefore, it is necessary to provide a novel lens driving device to solve the above technical problems.

SUMMARY

An object of the present application is to provide a lens driving device and an electronic device to solve the technical problem in the existing lens driving devices that the suspension wire also provides the electrical connection in addition to supporting the suspension arrangement, such that it will suffer deformation when supporting the support frame to move relative to the base, which will result in easy detachment of the suspension wire from the conductive terminal, thereby affecting the reliability of the lens driving device.

Technical solutions of this application will be specifically described below.

In a first aspect, this application provides a lens driving device, comprising:

a base;
a support frame suspended above the base;
a lens holder suspended within the support frame and configured for mounting of a lens;
a pair of conductive elastic sheets insulated from each other;
a circuit board arranged on the base;
an image sensor;
a support suspension wire;
a focusing circuit board;
a shared magnet;
a focusing coil; and
an anti-shake coil;
wherein the pair of conductive elastic sheets are elastically connected to the support frame and the lens holder; the circuit board comprises a stationary portion fixedly provided on the base and a movable portion suspended above the base and connected to the stationary portion; the image sensor is arranged on the movable portion; the support suspension wire is elastically connected to the pair of conductive elastic sheets and the stationary portion; the focusing circuit board is fixedly connected to the pair of conductive elastic sheets and the stationary portion, and is configured to electrically connect the pair of conductive elastic sheets to the stationary portion; the shared magnet is fixedly provided on the support frame; the focusing coil is fixedly provided on an outer side of the lens holder, and are electrically connected to the pair of conductive elastic sheets; the focusing coil is electrically coupled to the shared magnet to drive the lens holder to move in a direction of an optical axis; and the anti-shake coil is arranged at the movable portion, and is electrically coupled to the shared magnet to drive the movable portion to drive the image sensor to move in a direction perpendicular to the optical axis.

In some embodiments, the support suspension wire is welded to the movable portion or embedded in the movable portion by injection molding, and is electrically insulated from the movable portion.

In some embodiments, each of the pair of conductive elastic sheets comprises a first arm fixed to a side of the lens holder away from the base, a second arm fixed to a side of the support frame away from the base, and an elastic arm connecting the first arm with the second arm; and
the number of the second arm is two, and two second arms are both provided with the support suspension wire.

In some embodiments, a side of each of the pair of conductive elastic sheets is electrically connected to the focusing circuit board; each of the two second arms comprises a first arm portion close to the focusing circuit board and electrically connected to the focusing circuit board, and a second arm portion away from the focusing circuit board;
the first arm portion comprises a first conductive portion electrically connected to the focusing circuit board, a first mounting portion connected to the support suspension wire, and a first fixing portion connecting the first conductive portion with the first mounting portion; and the first fixing portion is fixedly provided on the support frame; and
the second arm portion comprises a second mounting portion connected to the support suspension wire, and a second fixing portion connected to the second mounting portion; and the second fixing portion is fixedly provided on the support frame.

In some embodiments, the support frame is provided with a first mounting column extending along the direction of the optical axis; and the first fixing portion and the second fixing portion are mounted to the support frame through the first mounting column; and the lens holder is provided with a second mounting column extending along the direction of the optical axis; and the first arm is mounted to the lens holder through the second mounting column.

In some embodiments, the support frame is provided with an accommodating slot, and each of the pair of conductive elastic sheets is at least partially accommodated in the accommodating slot.

In some embodiments, the support frame is provided with four avoidance slots extending along the direction of the optical axis; the four avoidance slots are distributed at four corners of the support frame, respectively; the number of the support suspension wire is four; and four support suspension wires are accommodated in the four avoidance slots, respectively.

In some embodiments, the circuit board further comprises a flexible portion, and the flexible portion is configured to move relative to the stationary portion during movement of the movable portion in the direction perpendicular to the optical axis; and the flexible portion comprises a first portion affixed to the movable portion, a second portion connected to the first portion and extending in the direction of the optical axis, a third portion connected to the second portion and extending around the optical axis, and a fourth portion connecting the third portion with the stationary portion.

In some embodiments, the focusing circuit board comprises an electrical connection portion fixed to the pair of conductive elastic sheets and electrically connected to the pair of conductive elastic sheets, a fixed connection portion fixedly provided on the support frame, and a main body portion; a first end of the main body portion of the focusing circuit board is connected to the electrical connection portion and the fixed connection portion, and a second end of the main body portion of the focusing circuit board is electrically connected to the stationary portion of the circuit board.

In a second aspect, this application further provides an electronic device, comprising:
 a device main body;
 a lens; and
 the above lens driving device;
 wherein the lens is mounted to the device main body through the lens driving device.

Compared to the prior art, this application has the following beneficial effects.

Regarding the lens driving lens provided herein, the pair of conductive elastic sheets is elastically connected to the support frame and the lens holder, and the support suspension wire is elastically connected to the conductive elastic sheets and the movable portion, such that the support suspension wire only plays a role in supporting the movable portion. Further, the circuit board is mounted on the base, and the focusing circuit board is elastically connected to the conductive elastic sheets and the stationary portion. The conductive elastic sheets are electrically connected to the stationary portion. The electrical connection is led through the circuit board, thereby ensuring the stability and reliability of the electrical connection between the conductive elastic sheets, the focusing circuit board and the circuit board.

Figure 1:
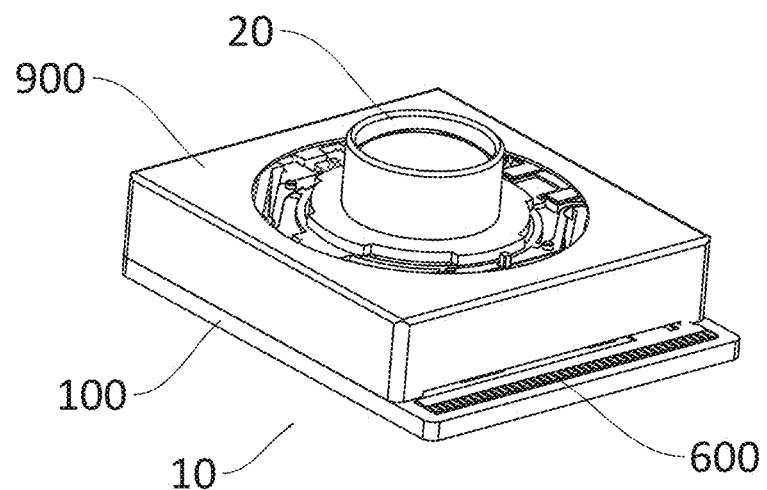
FIG. 1 schematically shows a lens driving device and lens according to an embodiment of this application.

In the drawings: 10, lens driving device; 20, lens; and 30, device main body;
100, base; 200, support frame; 210, mounting groove; 220, first mounting column; 230, accommodating slot; 240, avoidance slot; 300, lens holder; 310, second mounting column; 400, conductive elastic sheet; 410, first arm; 420, second arm; 421, first arm portion; 4211, first mounting portion; 4212, first conductive portion; 4213, first fixing portion; 422, second arm portion; 4221, second mounting portion; 4222, second fixing portion; 430, elastic arm; 500, support suspension wire; 600, circuit board; 610, movable portion; 611, first plate body; 6111, placement slot; 612, second plate body; 6121, light avoidance hole; 620, stationary portion; 621, connection section; 622, insertion section; 630, flexible portion; 631, first portion; 632, second portion; 633, third portion; 6331, first extending section; 6332, second extending section; 634, fourth portion; 700, focusing circuit board; 710, electrical connection portion; 720, fixed connection portion; 730, main body portion; 810, shared magnet; 820, focusing coil; 830, anti-shaking coil; 841, first elastic sheet; 842, second elastic sheet; 850, image sensor; 851, glass plate; and 900, shell.

DETAILED DESCRIPTION OF THE EMBODIMENTS

The present application will be described clearly and completely below with reference to the accompanying drawings and embodiments to make objects, technical solutions, and advantages of the present application clearer and better understood.

Obviously, described herein are only some embodiments of the present disclosure, instead of all embodiments. Based on the embodiments provided herein, all other embodiments obtained by a person of ordinary skill in the art without making creative labor shall fall within the scope of the present disclosure.

It should be noted that similar labels and letters indicate similar items in the following accompanying drawings, so that once an item has been defined in one accompanying drawing, it does not need to further define and explain such item in subsequent accompanying drawings.

As used herein, it is to be noted that the orientation or position relationship indicated by the terms "upper", "lower", "inner" and "outer" is based on the orientation or positional relationship shown in the accompanying drawings, or an orientation or positional relationship in which the product is often placed. These terms are only for the purpose of facilitating and simplifying the description of the present disclosure, and are not intended to indicate or imply that the device or element referred to must have a particular orientation, be constructed and operated in a particular orientation, and is therefore not to be construed as a limitation of the present disclosure.

Furthermore, the terms "first", "second", etc. are used only for the purpose of differentiating features, and are not to be understood as indicating or implying relative importance.

It should be noted that the features in the embodiments of the present disclosure may be combined with each other in the absence of contradiction.

Referring to FIGS. 1-8, this application provides a lens driving device 10, which includes a base 100, a support frame 200, a lens holder 300, a pair of conductive elastic sheets 400, a support suspension wire 500, a circuit board 600, an image sensor 850, a focusing circuit board 700, a shared magnet 810, a focusing coil 820 and an anti-shake coil 830.

In this embodiment, the support frame 200 is suspended above the base 100, and the lens holder 300 is suspended within the support frame 200 and configured for mounting of a lens 20. The pair of conductive elastic sheets 400 is insulated from each other, and the conductive elastic sheets 400 are elastically connected to the support frame 200 and the lens holder 300. The lens holder 300 is suspended within the support frame 200 through the conductive elastic sheets 400, such that the lens holder 300 and the lens 20 arranged thereon can move up and down in the direction of an optical axis.

In this embodiment, the circuit board 600 is mounted on the base 100, and includes a stationary portion 620 fixedly provided on the base 100, and a movable portion 610 suspended above the base 100 and connected to the stationary portion 620. The image sensor 850 is arranged on the movable portion 610. The support suspension wire 500 is elastically connected to the conductive elastic sheets 400 and the movable portion 610, so as to suspend the movable portion 610 above the base 100. The movable portion 610 is suspended between the base 100 and the support frame 200 through the support suspension wire 500, such that the movable portion 610 can drive the image sensor 850 to move along a direction perpendicular to the optical axis.

In this embodiment, the focusing circuit board 700 is fixedly connected to the conductive elastic sheets 400 and the stationary portion 620, and electrically connects the conductive elastic sheets 400 to the stationary portion 620. The shared magnet 810 is fixed to the support frame 200.

Further, the focusing coil 820 is fixed to an outer side of the lens holder 300, and is electrically connected to the pair of conductive elastic sheets 400. The focusing coil 820 is electrically coupled to the shared magnet 810 to drive the lens holder 300 to move in the direction of the optical axis, thereby realizing the autofocus function (AF) of the lens driving device 10. The anti-shake coil 830 is electrically coupled to the shared magnet 810 to drive the movable portion 610 to drive the image sensor 850 to move in the direction perpendicular to the optical axis, thereby realizing the optical image stabilization function (OIS) of the lens driving device 10.

It can be understood that the support frame 200 and the lens holder 300 are elastically connected by the conductive elastic sheets 400, and the support suspension wire 500 is elastically connected to the conductive elastic sheets 400 and the movable portion 610, such that the support suspension wire 500 only plays a role in supporting the movable portion 610. Further, the circuit board 600 is mounted to the base 100, and the focusing circuit board 700 is fixedly connected to the conductive elastic sheets 400 and the stationary portion 620, and electrically connects the conductive elastic sheets 400 with the stationary portion 620. Electrical connection is led from the circuit board 600 to ensure the stability and reliability of the electrical connection of the conductive elastic sheets 400, the focusing circuit board 700 and the circuit board 600.

Specifically, the number of the shared magnet 810 is four, and the four shared magnets 810 are provided around the focusing coil 820 and are in centrosymmetric arrangement with respect to the optical axis to form a uniform magnetic field. A magnetizing direction of the shared magnets 810 is perpendicular to the optical axis.

In this embodiment, four mounting grooves 210 are formed on the support frame 200, and are distributed at four corners of the support frame 200, respectively. The four shared magnets 810 are fixed in the four mounting grooves 210 in one-to-one correspondence.

Figure 2:
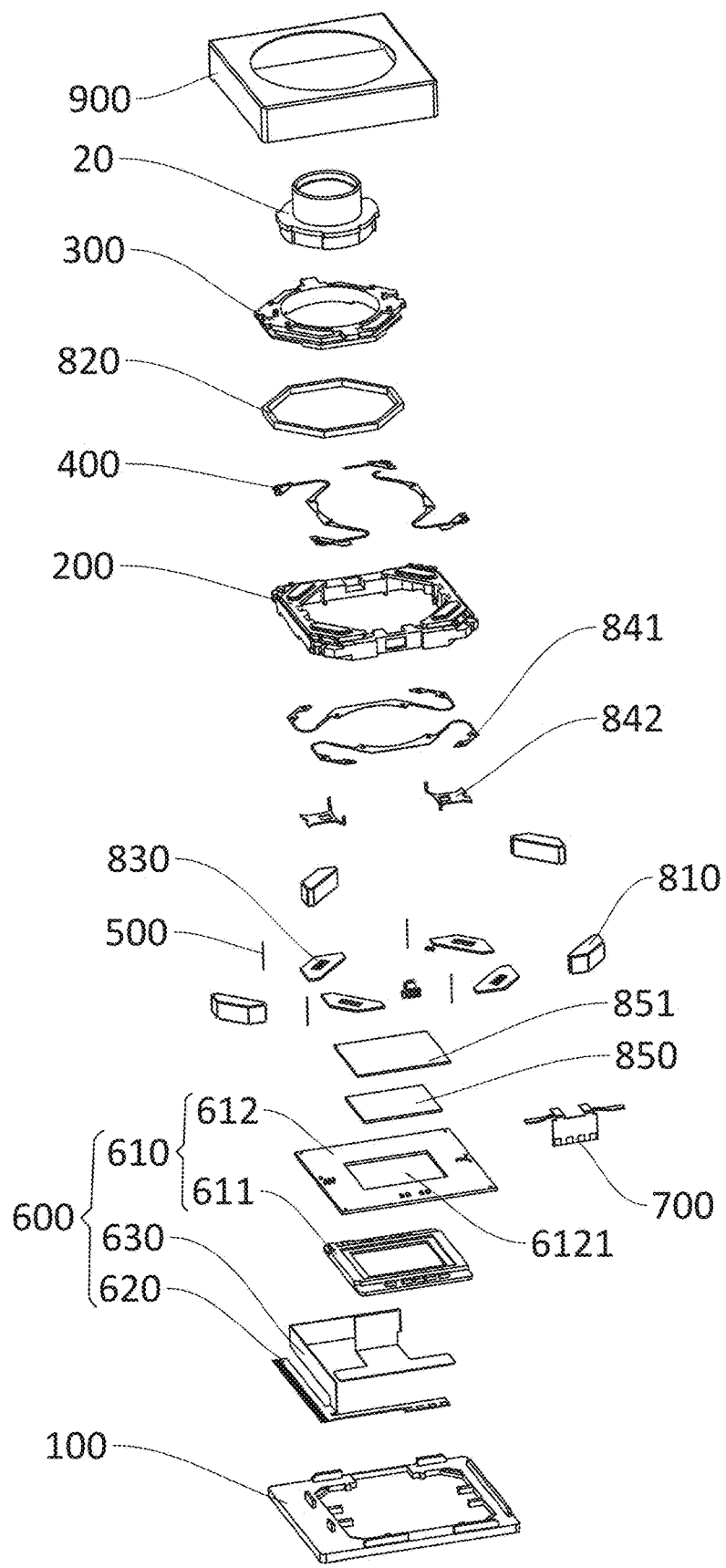
FIG. 2 is an exploded view of the lens driving device and the lens shown in FIG. 1.
Figure 3:
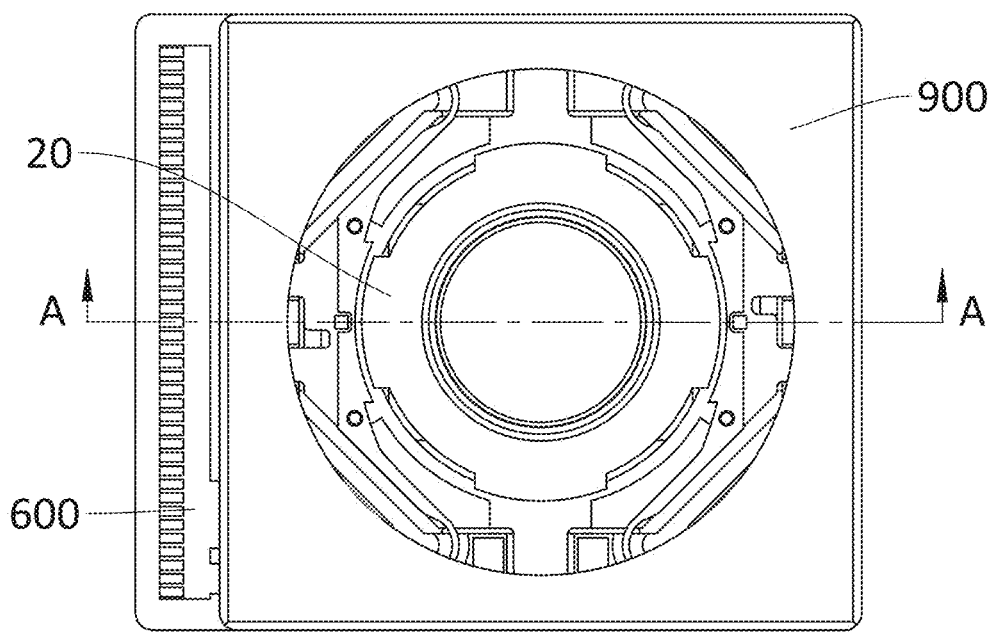
FIG. 3 is a top view of the lens driving device and the lens shown in FIG. 1.
Figure 4:
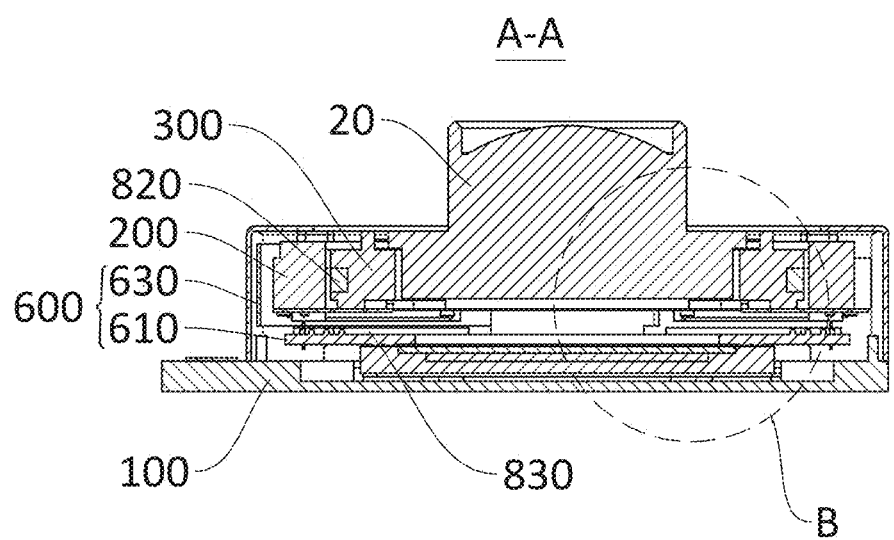
FIG. 4 is a sectional view of the lens driving device and the lens in FIG. 3 along A-A line.
Figure 5:
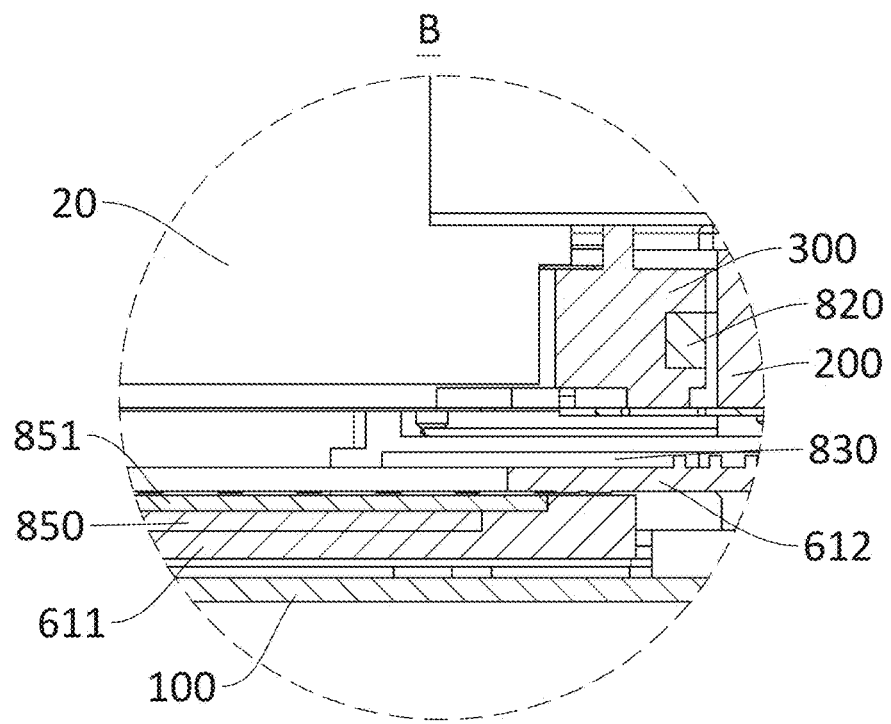
FIG. 5 is an enlarged view of part B in FIG. 4.
Figure 8:
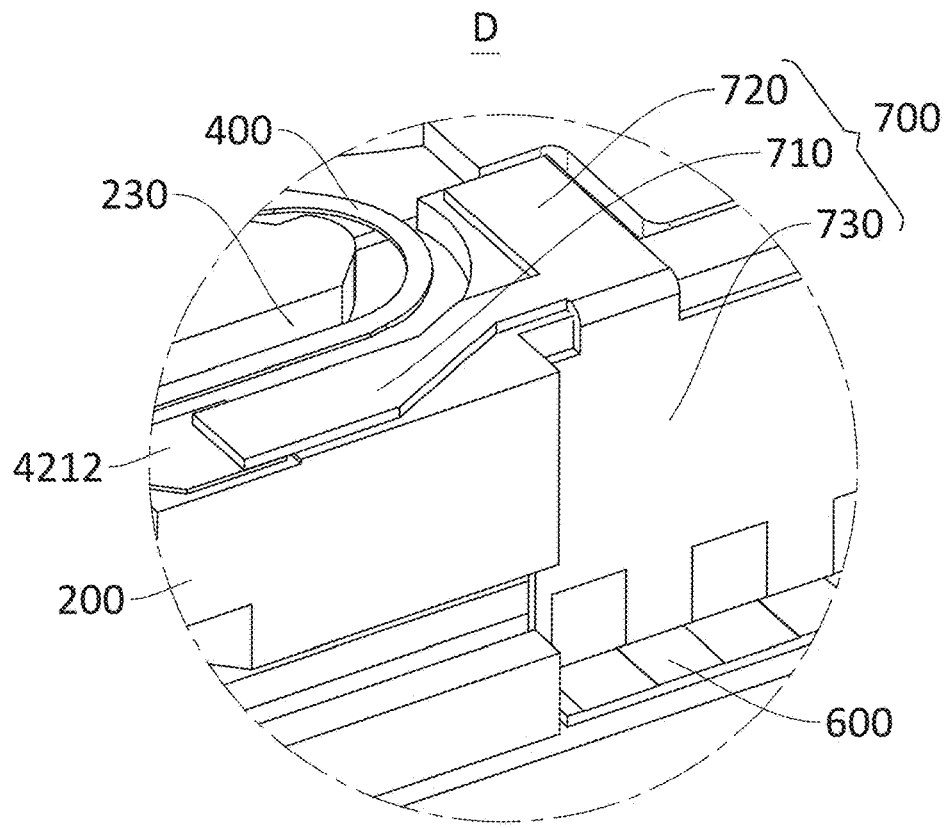
FIG. 8 is an enlarged view of part D in FIG. 6.
Figure 10:
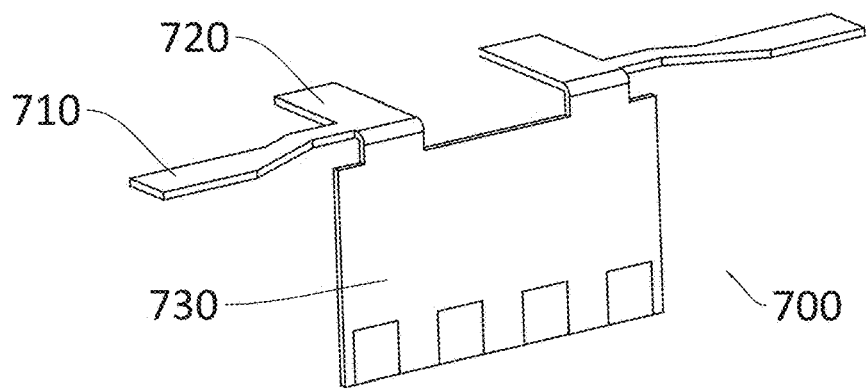
FIG. 10 schematically illustrates a focusing circuit board in the lens driving device in FIG. 1.
Figure 11:
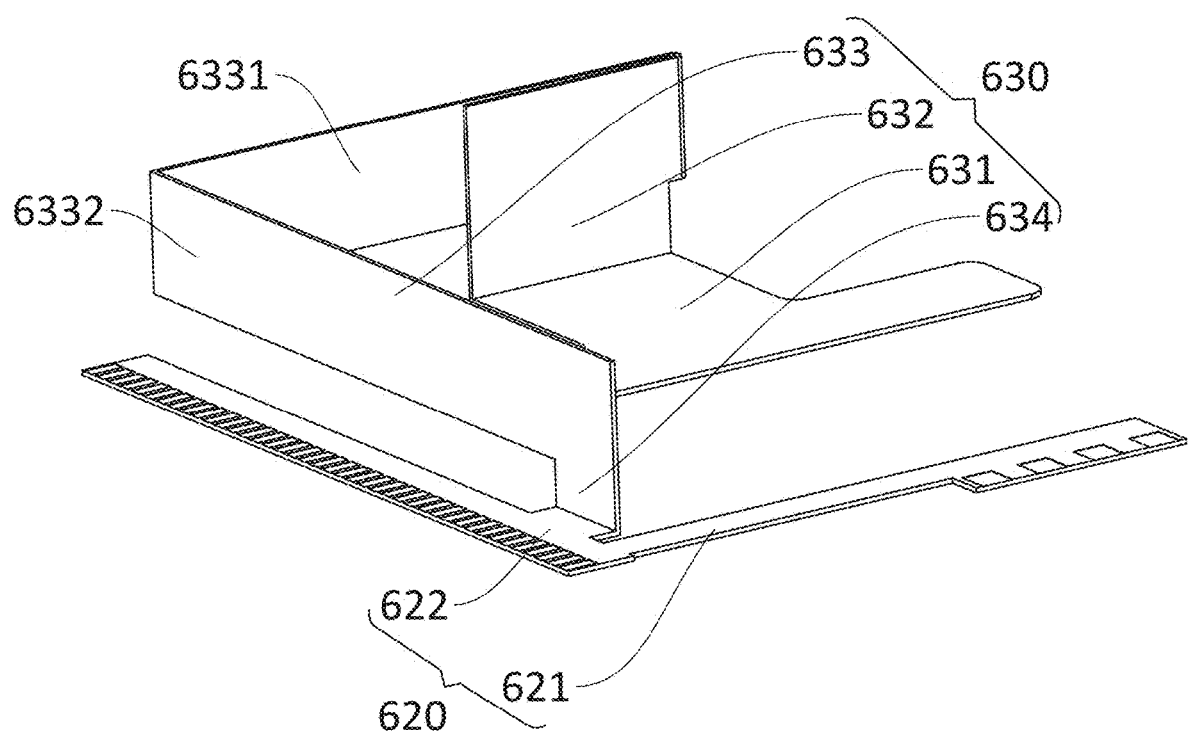
FIG. 11 schematically illustrates a stationary portion and a flexible portion of a circuit board in the lens driving device in FIG. 1.
Figure 12:
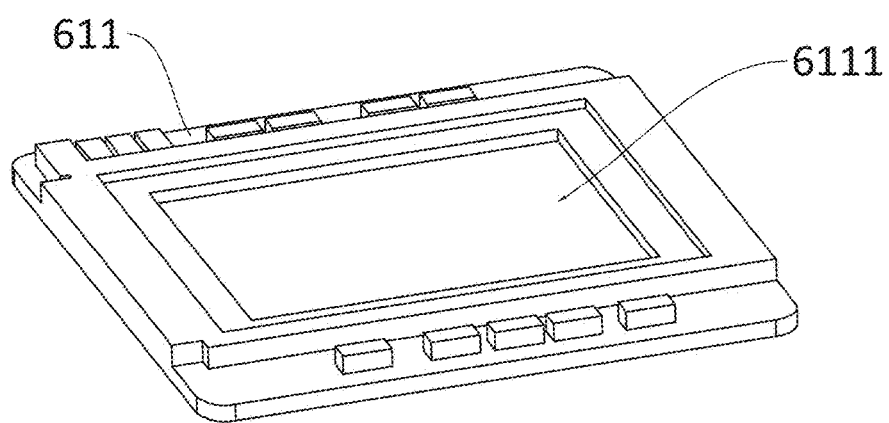
FIG. 12 schematically shows a first plate body of the circuit board in the lens driving device in FIG. 1.
Figure 13:
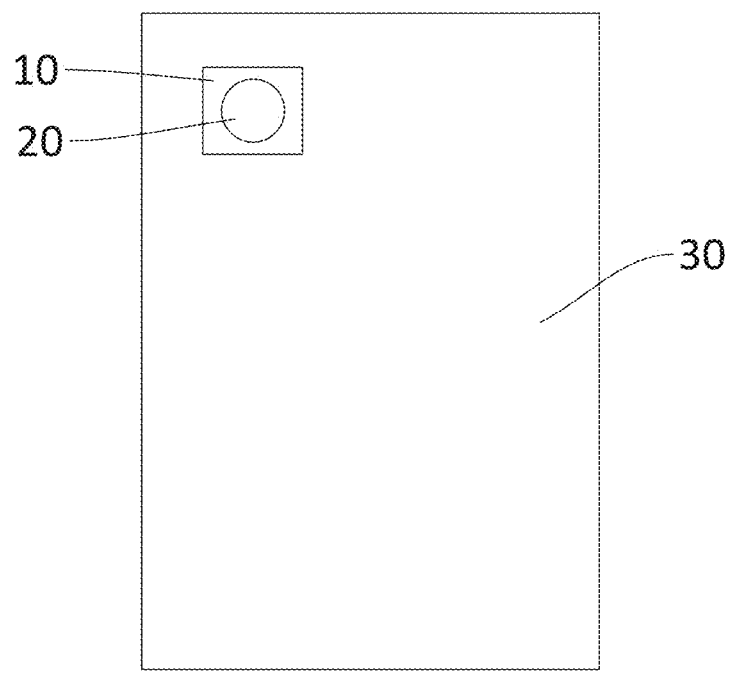
FIG. 13 schematically shows an electronic device according to an embodiment of this application.

In an embodiment, referring to FIGS. 2, 8 and 10, the focusing circuit board 700 includes an electrical connection portion 710 fixed and electrically connected to the conductive elastic sheets 400, a fixed connection portion 720 fixed to the support frame 200, and a main body portion 730. One end of the main body portion 730 is connected to the electrical connection portion 710 and the fixed connection portion 720, and the other end of the main body portion 730 is electrically connected to the stationary portion 620 of the circuit board 600, so as to enable the electrical connection between the conductive elastic sheets 400 and the circuit board 600, and form an electric circuit between the focusing coil 820, the conductive elastic sheets 400, the focusing circuit board 700 and the circuit board 600.

Further, two electrical connection portions 710 are provided, and are electrically connected with the conductive elastic sheets in one-to-one correspondence. Two fixed connection portions 720 are symmetrically provided with respect to the main body portion 730. Specifically, the focusing circuit board 700 is provided with an integrated circuit (IC) and a capacitor, and is weldedly fixed to the stationary portion 620 of the circuit board 600.

Figure 6:
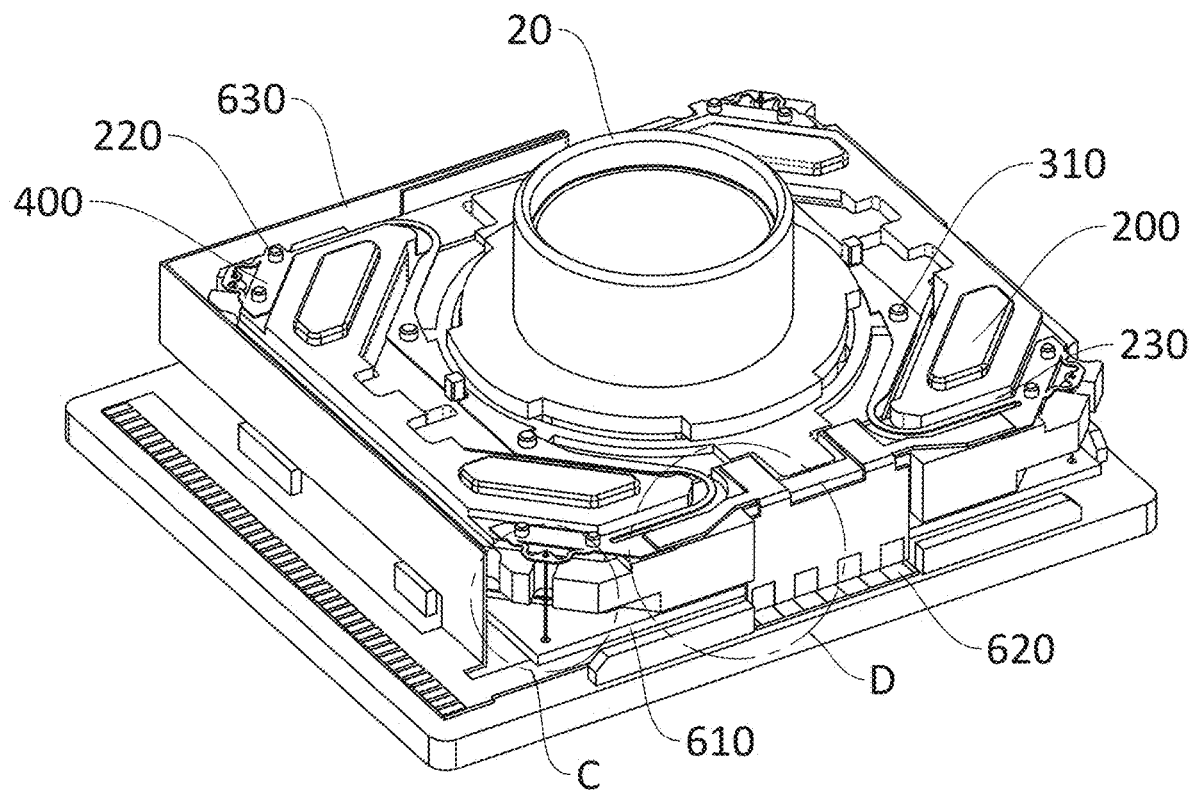
FIG. 6 schematically shows the lens driving device and the lens in FIG. 1 in the absence of a shell.
Figure 7:
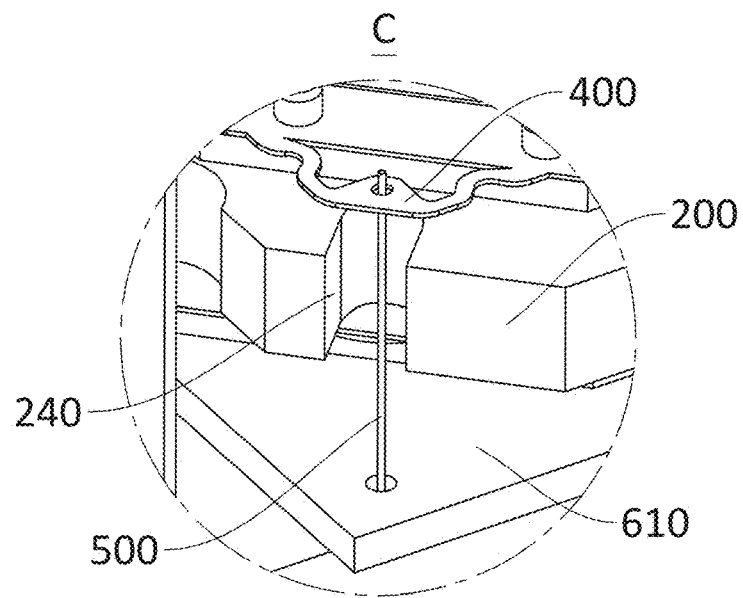
FIG. 7 is an enlarged view of part C in FIG. 6.

In an embodiment, referring to FIGS. 2, 6 and 7, the support suspension wire 500 is welded to the movable portion 610 or embedded in the movable portion 610 by injection molding, and is electrically insulated from the movable portion 610, such that the support suspension wire 500 does not have the function of electric conduction.

Further, the support suspension wire 500 may be a metal wire. A bottom of the support suspension wire 500 is welded to the base 100 or embedded in the base 100. In some embodiments, the support suspension wire 500 may also be a plastic support part, and is welded to the circuit board 600 or embedded in the circuit board 600.

In an embodiment, referring to FIGS. 6-9, the conductive elastic sheet 400 includes a first arm 410 fixed to a side of the lens holder 300 away from the base 100, a second arm 420 fixed to a side of the support frame 200 away from the base 100, and an elastic arm 430 connecting the first arm 410 with the second arm 420, that is, the lens holder 300 is suspended within the support frame 200 through the conductive elastic sheet 400, such that the lens holder 300 and the lens 20 mounted thereon can move up and down along the direction of the optical axis.

In this embodiment, two second arms 420 of each conductive elastic sheet 400 are each provided with the support suspension wire 500, that is, four support suspension wires 500 are provided. In an embodiment, the four support suspension wires 500 are in centrosymmetric arrangement with respect to the optical axis.

In an embodiment, referring to FIGS. 6-9, a side of each conductive elastic sheet 400 is electrically connected to the focusing circuit board 700. The second arm includes a first arm portion 421 close to the focusing circuit board 700 and electrically connected to the focusing circuit board 700, and a second arm portion 422 away from the focusing circuit board 700, that is, each conductive elastic sheet 400 only has one electrical connection path to the outside.

The first arm portion 421 includes a first conductive portion 4212 electrically connected to the focusing circuit board 700, a first mounting portion 4211 connected to the support suspension wire 500, and a first fixing portion 4213 connecting the first conductive portion 4212 with the first mounting portion 4211; and the first fixing portion 4213 is fixedly provided on the support frame 200, so as to enable the electrical connection to the outside through the first arm portion 421. Specifically, the focusing circuit board 700 is a flexible board.

The second arm portion 422 includes a second mounting portion 4221 connected to the support suspension wire 500, and a second fixing portion 4222 connected to the second mounting portion 4221; and the second fixing portion 4222 is fixedly provided on the support frame. The second arm portion 422 does not has the electrical connection path to the outside.

In some embodiments, the second arm portion may also be provided with a conductive portion and a flexible board adapted to the conductive portion, so as to enable the electrical connection between the conductive elastic sheet 400 and the circuit board 600.

Figure 9:
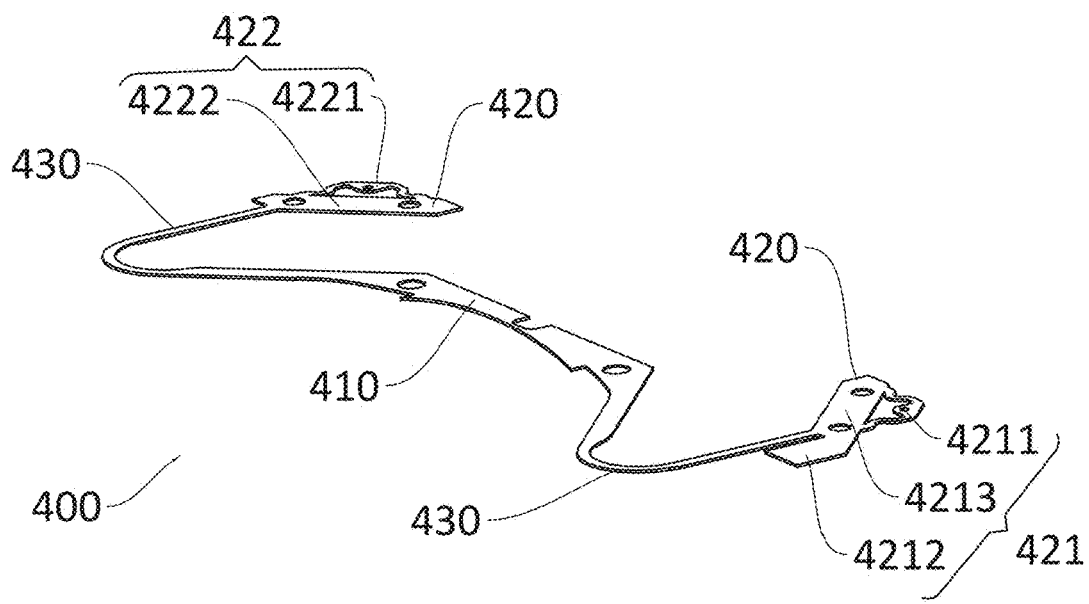
FIG. 9 schematically illustrates a conductive elastic sheet in the lens driving device in FIG. 1.

In an embodiment, referring to FIGS. 6 and 9, the support frame 200 is provided with a first mounting column 220 extending along the direction of the optical axis; and the first fixing portion 4213 and the second fixing portion 4222 are mounted to the support frame 200 through the first mounting column 220, thereby facilitating the arrangement of the conductive elastic sheet 400 on the support frame 200.

The lens holder 300 is provided with a second mounting column 310 extending along the direction of the optical axis; and the first arm 410 is mounted to the lens holder 300 through the second mounting column 310, so as to facilitate the arrangement of the conductive elastic sheet 400 on the lens holder 300.

Further, in this embodiment, the support frame 200 is provided with an accommodating slot 230, and the conductive elastic sheet 400 is at least partially accommodated in the accommodating slot 230, so as to facilitate mounting the conductive elastic sheet 400.

Specifically, the support frame 200 is further provided with four avoidance slots 240 extending along the direction of the optical axis; the four avoidance slots 240 are distributed at four corners of the support frame 200, respectively; the number of the support suspension wire 500 is four; and four support suspension wires 500 are accommodated in the four avoidance slots 240, respectively, so as to facilitate the arrangement of the support suspension wires 500.

In an embodiment, referring to FIGS. 2, 4-6 and 11, the circuit board 600 further includes a flexible portion 630, and the flexible portion 630 is configured to move relative to the stationary portion 620 during movement of the movable portion 610 in the direction perpendicular to the optical axis. The flexible portion 630 includes a first portion 631 affixed to the movable portion 610, a second portion 632 connected to the first portion 631 and extending in the direction of the optical axis, a third portion 633 connected to the second portion 632 and extending around the optical axis, and a fourth portion 634 connecting the third portion 633 with the stationary portion 620, such that an electrical connection is led through the flexible portion 630. Since the flexible portion 630 has a large movable degree of freedom, the stability and reliability of the electrical connection between the conductive elastic sheet 400, the focusing circuit board 700 and the circuit board 600 can be ensured.

Specifically, the flexible portion 630 and the stationary portion 620 are both a flexible plate, and the stationary portion 620 includes a connection section 621 and an insertion section 622. The fourth portion 634 of the flexible portion 630 is connected to the insertion section 622. The connection section 621 is fixedly provided on the base 100, and connects the connection section 622 with the focusing circuit board 700. The insertion section 622 is configured for inserted connection with the outside.

The third portion includes a first extending section 6331 and a second extending section 6332. The support frame 200 includes a first side surface and a second side surface connected with each other. The first extending section 6331 is connected to the second portion 632, and extends along a plane where the first side surface is located. The second extending section 6332 is connected to the first extending section 6331, and extends along a plane where the second side surface is located. Further, the second extending section 6332 is perpendicular to the first extending section 6331.

In an embodiment, the movable portion 610 includes a first plate body 611 and a second plate body 612. A light-receiving side of the first plate body 611 is provided with a placement slot 6111, in which the image sensor 850 is accommodated. A glass plate 851 is covered on an opening of the placement slot 6111. The second plate body 612 is stacked on the first plate body 611, and is provided with a light avoidance hole 6121 to avoid the light beams. Four anti-shake coils 830 are provided, and distributed at four corners of the second plate body 612, respectively. Specifically, the first portion 631 of the flexible portion 630 is connected to a bottom surface of the first plate body 611, and is electrically connected to the first plate body 611.

In an embodiment, referring to FIGS. 1 and 2, the lens driving device 10 further includes a pair of first elastic sheets 841 and a pair of second elastic sheets 842. The lens holder 300 is suspended within the support frame 200 through the first elastic sheets 841 and the second elastic sheets 842. The conductive elastic sheet 400, the first elastic sheet 841 and the second elastic sheet 842 both have a spring plate structure whose deformation direction is along the direction of the optical axis.

Specifically, a first end of each of the first elastic sheet 841 and the second elastic sheet 842 is fixed to a side of the lens holder 300 facing toward the base 100, and a second end of each of the first elastic sheet 841 and the second elastic sheet 842 is fixed to a side of the support frame 200 facing toward the base 100. Further, the pair of first elastic sheets 841 is in centrosymmetric arrangement with respect to the optical axis, and the pair of second elastic sheets 842 is also in centrosymmetric arrangement with respect to the optical axis. Moreover, the first elastic sheets 841 and the second elastic sheets 842 are arranged spaced apart along a circumferential direction of the optical axis.

In this embodiment, the lens driving device 10 further includes a shell 900 sleeved on the support frame 200 and fixedly supported on the base 100. The shell 900 provides protection for internal components of the lens driving device 10. A top wall of the support frame 200 is fixedly connected to an inner wall of the shell 900 to suspend the support frame 200 above the base 100.

Referring to FIGS. 1-13, this application further provides an electronic device, including a device main body 30, a lens 20 and the lens driving device 10 described in any one of the above embodiments. The lens 20 is mounted to the device main body 30 through the lens driving device 10. The electronic device can be mobile phone, camera or computer. The lens 20 includes a lens barrel fixed on the lens holder 300 and a lens group fixed in the lens barrel.

Described above are only preferred embodiments of the present application, which are not intended to limit the present application. It should be noted that any variations, replacements and modifications made by those of ordinary skill in the art without departing from the spirit and scope of the present application shall fall within the scope of the present application defined by the appended claims.

What is claimed is:

1. A lens driving device, comprising:
   a base;
   a support frame suspended above the base;
   a lens holder suspended within the support frame and configured for mounting of a lens;
   a pair of conductive elastic sheets insulated from each other;
   a circuit board arranged on the base;
   an image sensor;
   a support suspension wire;
   a focusing circuit board;
   a shared magnet;
   a focusing coil; and
   an anti-shake coil;
   wherein the pair of conductive elastic sheets are elastically connected to the support frame and the lens holder; the circuit board comprises a stationary portion fixedly provided on the base and a movable portion suspended above the base and connected to the stationary portion; the image sensor is arranged on the movable portion; the support suspension wire is elastically connected to the pair of conductive elastic sheets and the stationary portion; the focusing circuit board is fixedly connected to the pair of conductive elastic sheets and the stationary portion, and is configured to electrically connect the pair of conductive elastic sheets to the stationary portion; the shared magnet is fixedly provided on the support frame; the focusing coil is fixedly provided on an outer side of the lens holder, and are electrically connected to the pair of conductive elastic sheets; the focusing coil is electrically coupled to the shared magnet to drive the lens holder to move in a direction of an optical axis; and the anti-shake coil is arranged at the movable portion, and is electrically coupled to the shared magnet to drive the movable portion to drive the image sensor to move in a direction perpendicular to the optical axis.

2. The lens driving device of claim 1, wherein the support suspension wire is welded to the movable portion or embedded in the movable portion by injection molding, and is electrically insulated from the movable portion.

3. The lens driving device of claim 2, wherein each of the pair of conductive elastic sheets comprises a first arm fixed to a side of the lens holder away from the base, a second arm fixed to a side of the support frame away from the base, and an elastic arm connecting the first arm with the second arm; and
   the number of the second arm is two, and two second arms are both provided with the support suspension wire.

4. The lens driving device of claim 3, wherein a side of each of the pair of conductive elastic sheets is electrically connected to the focusing circuit board; each of the two second arms comprises a first arm portion close to the focusing circuit board and electrically connected to the focusing circuit board, and a second arm portion away from the focusing circuit board;
   the first arm portion comprises a first conductive portion electrically connected to the focusing circuit board, a first mounting portion connected to the support suspension wire, and a first fixing portion connecting the first conductive portion with the first mounting portion; and the first fixing portion is fixedly provided on the support frame; and
   the second arm portion comprises a second mounting portion connected to the support suspension wire, and a second fixing portion connected to the second mounting portion; and the second fixing portion is fixedly provided on the support frame.

5. The lens driving device of claim 4, wherein the support frame is provided with a first mounting column extending along the direction of the optical axis; and the first fixing portion and the second fixing portion are mounted to the support frame through the first mounting column; and
   the lens holder is provided with a second mounting column extending along the direction of the optical axis; and the first arm is mounted to the lens holder through the second mounting column.

6. The lens driving device of claim 3, wherein the support frame is provided with an accommodating slot, and each of the pair of conductive elastic sheets is at least partially accommodated in the accommodating slot.

7. The lens driving device of claim 3, wherein the support frame is provided with four avoidance slots extending along the direction of the optical axis; the four avoidance slots are distributed at four corners of the support frame, respectively; the number of the support suspension wire is four; and four support suspension wires are accommodated in the four avoidance slots, respectively.

8. The lens driving device of claim 1, wherein the circuit board further comprises a flexible portion, and the flexible portion is configured to move relative to the stationary portion during movement of the movable portion in the direction perpendicular to the optical axis; and
   the flexible portion comprises a first portion affixed to the movable portion, a second portion connected to the first portion and extending in the direction of the optical axis, a third portion connected to the second portion and extending around the optical axis, and a fourth portion connecting the third portion with the stationary portion.

9. The lens driving device of claim 1, wherein the focusing circuit board comprises an electrical connection portion fixed to the pair of conductive elastic sheets and electrically connected to the pair of conductive elastic sheets, a fixed connection portion fixedly provided on the support frame, and a main body portion; a first end of the main body portion of the focusing circuit board is connected to the electrical connection portion and the fixed connection portion, and a second end of the main body portion of the focusing circuit board is electrically connected to the stationary portion of the circuit board.

10. An electronic device, comprising:
a device main body;
a lens; and
the lens driving device of claim 1;
wherein the lens is mounted to the device main body through the lens driving device.

\* \* \* \* \*